United States Patent [19]

Sterling et al.

[11] 4,195,980
[45] Apr. 1, 1980

[54] METHOD OF MANUFACTURING A CONTINUOUS OPTICAL PREFORM

[75] Inventors: Henley F. Sterling, Great Dunmow; John Irven, Harlow, both of England

[73] Assignee: International Standard Electric Corporation, New York, N.Y.

[21] Appl. No.: 906,185

[22] Filed: May 15, 1978

[30] Foreign Application Priority Data

May 17, 1977 [GB] United Kingdom ............... 20681/77

[51] Int. Cl.² ........................ C03C 25/00; C03C 25/02
[52] U.S. Cl. ........................ 65/3 A; 65/4 B; 156/153; 156/158; 156/256; 156/272; 156/304; 156/294; 156/296; 219/121 LM
[58] Field of Search ............... 156/153, 158, 256, 264, 156/294, 296, 304, 306, 309, 272; 65/3 A, 4 R, 1, 4 A, 4 B, 42, 43, 2; 350/96.21; 219/121 LM; 285/55

[56] References Cited

U.S. PATENT DOCUMENTS

| | | | |
|---|---|---|---|
| 227,830 | 5/1880 | Phipps | 285/55 |
| 3,035,958 | 5/1962 | Wilkins | 156/294 |
| 3,579,316 | 5/1971 | Dyott et al. | 65/42 |
| 3,798,099 | 3/1974 | Marcatili | 156/304 |
| 3,826,521 | 7/1974 | Wilhelmsen | 156/294 |
| 3,877,912 | 4/1975 | Shiraishi et al. | 65/4 B |
| 3,932,162 | 1/1976 | Blankenship | 65/3 A |
| 3,935,419 | 1/1976 | Lambert et al. | 219/121 LM |
| 4,009,014 | 2/1977 | Black et al. | 65/3 A |
| 4,078,910 | 3/1978 | Dalgoutte | 65/3 A |

*Primary Examiner*—Jerome W. Massie
*Attorney, Agent, or Firm*—John T. O'Halloran; Peter C. Van Der Sluys

[57] ABSTRACT

A method of manufacturing a continuous preform for an optical fibre of the type produced from glass or silica tubes or rods, the method including arranging the tubes or rods end to end in a rectilinear array, placing glass or silica sleeving tubes over the joints between the rods or tubes, and fusion sealing the joints between the rods or tubes.

7 Claims, 4 Drawing Figures

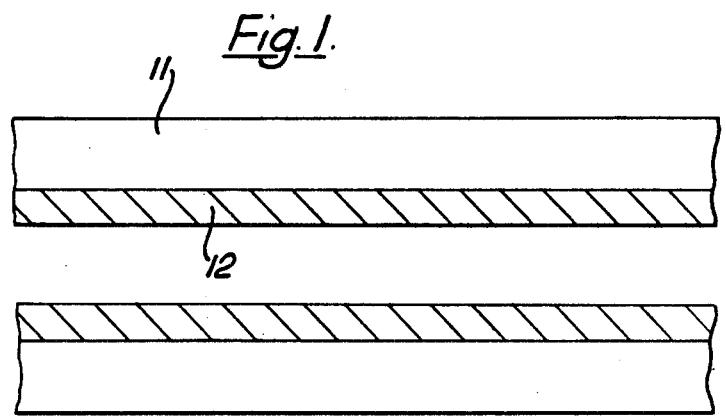
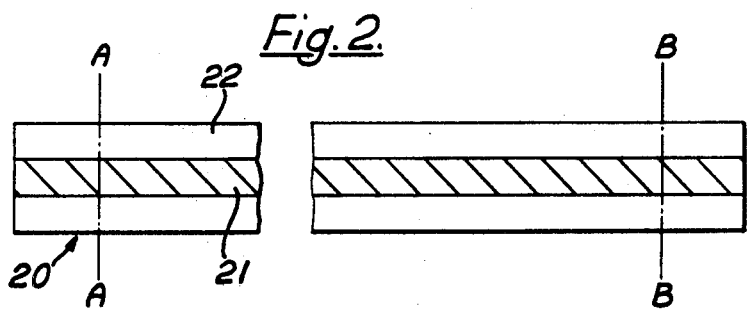
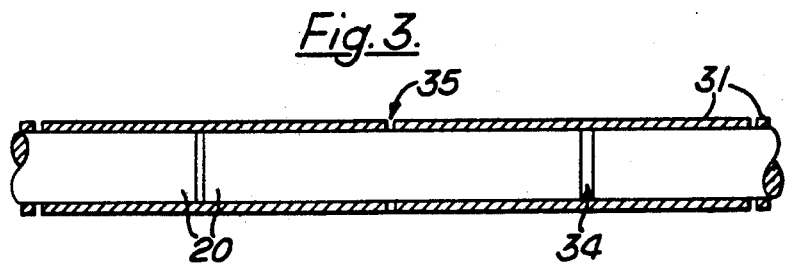

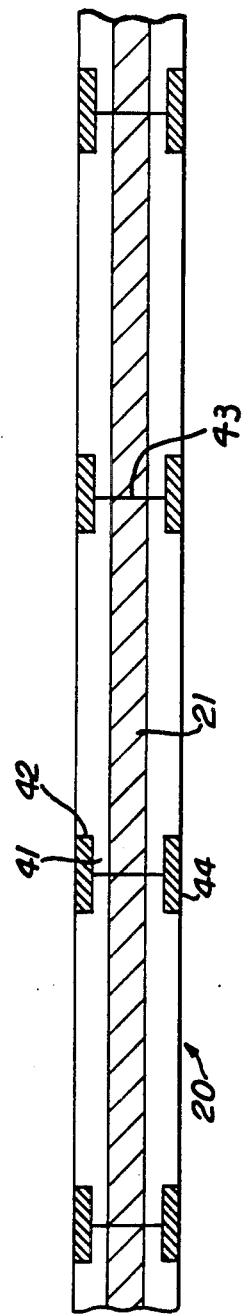

METHOD OF MANUFACTURING A CONTINUOUS OPTICAL PREFORM

This invention relates to the production of optical fibre preforms and to the production of optical fibers therefrom.

Clad optical fibers, e.g. of the clad silica type, are generally manufactured from tubing which is coated on its inner surface with a dopant or doped glass layer and is then heated and collapsed inwardly to provide a rod preform. The preform may then be drawn to produce a length, typically 3 Km, of optical fibre, the ends of the preform then being discarded. Alternatively the coated tube may be drawn directly into fibre. This process produces industrial lengths of fibre, but in some applications it would be advantageous to produce optical fibre by a continuous drawing process.

According to the invention there is provided a method of manufacturing a continuous preform for an optical fibre of the type produced from glass or silica tubes or rods, the method including arranging the tubes or rods end to end in a rectilinear array, placing glass or silica sleeving tubes over the joints between the rods or tubes, and fusion sealing the joints between the rods or tubes.

According to the invention there is provided a method of manufacturing a continuous preform for an optical fibre of the type produced from a silica tube via a rod preform stage, the method including collapsing inwardly lengths of silica tube each into a rod preform, removing the end portions of each rod preform, arranging the preforms end to end in a rectilinear array, placing silica sleeving tubes end to end over the rods, each said sleeving tube being a sliding fit on the rods, and fusion sealing the assembly into a continuous rod, and in which the sleeving tubes are so arranged that the joints therebetween are not coincident with the joints between the rods.

An embodiment of the invention will now be described with reference to the drawings.

FIGS. 1 to 3 show successive stages in the production of a preform for a continuous fibre drawing process and;

FIG. 4 shows an alternative method of producing a preform.

Referring to FIGS. 1 to 3, which are not to scale, a silica tube 11 is provided with one or more internal coatings 12 of doped silica, e.g. by a vapour phase reaction process such as that described in our published U.K. Specification No. 1,427,327 (R. W. J. Uffen - 2) and in our co-pending application No. 39444/73 (P. E. Lighty — P. W. Black — J. Irven 12-3-2). The internally coated tube is then heated to effect collapse into a rod preform 20 (FIG. 2), the internal coating becoming the core 21 of the preform and the silica tube the cladding 22. The end portions of the preform 20 are removed by cutting at line A — A and B — B and the cut ends of the remaining centre portion of the preform are ground and polished perpendicular to the longitudinal axis of the preform.

As shown in FIG. 3 a plurality of prepared rod preforms 20 are arranged end to end inside silica sleeve tubes 31 which tubes are a sliding fit on the preforms 20. The rod preforms 20 and the tubes 31 are pushed axially together into respective abutment and the arrangement is then heated and fusion sealed into a continuous preform rod. The joints 34 and 35 between the rods 20 and the tubes 31 respectively are staggered as shown in FIG. 3. During the fusion process, the surface tension of the tubes 31 ensures concentricity of the joints between the preforms 20. The completed preform assembly may then be drawn into a continuous fibre. By fusing preforms together inside the staggered sleeving tubes, the disturbance to the core region is minimised.

Note that the transmission of light down the finished fibre is confined to the core region 20, the outer sleeve 31, does not adversely effect the optical properties of the finished fibre.

In a variation of the method cut and prepared lengths of preform rod are slipped inside relatively long lengths of sleeving tube. The assembly is then fed into the fibre drawing zone where fusion of the preforms and the containing sleeve takes place immediately prior to fibre drawing. Joints in the sleeve are made as and where necessary, but never coincident with the rod preform joints and much less frequently.

FIG. 4 shows an alternative method of coupling preform rods or tubes together to provide a continuous preform. The ends of each preform rod 20 are ground down to provide a reduced diameter portion 41 and a shoulder 42. The rods 20 are then butted together end to end, each joint 43 being anchored by a silica collar 44. The collars 44 which have the same external diameter as the preforms, ensure alignment of the coated core region of the preforms during the subsequent jointing process.

The heating of both forms of preform assembly to effect jointing is arranged so as to minimise any distortions which would tend to occur at the joints 34 or 43 between the preform rods. In one fusion process the preform rods fitted with their sleeving tubes or collars are arranged vertically and are rotated in a localised hot zone. The assembly is moved vertically downwards as heating and fusion progresses, more preform rods and sleeve tubes or collars being added successively from the top. The process is performed under constant weight conditions. More rigid control may be provided by performing the process in a precision glass lathe.

In the methods shown in FIGS. 1 to 3 and in FIG. 4, the joints 34 and 43 between the rods and 35 between the sleeve tubes are shown as plane parallel. In some applications however other coincident joint configurations, such as conical, concave/convex, half lap, castellated, keyed or angled may be employed.

An alternative to the method of cutting, grinding and polishing preform ends prior to jointing is to use an improved preparation method. Thus, for example, a perfectly clean optically good end surface can be prepared on silica rod, tubing or preform in a single process when using a $CO_2$ laser cutting method. Operating close to 10.6 micron the energy is absorbed by the silica directly, which is therefore heated to its melting point when sufficient power is supplied. (Such a method is now often used for heating preforms for fibre drawing). Correct conditions ensure a flat, optically 'fire polished' surface without the rounding of edges normally produced when softening glass. Such a method may also be used to heat tubes, rods and preform assemblies to complete a joint.

The continuous preforms prepared by the process described herein may be drawn into fibre by conventional drawing techniques. In a particularly advantageous arrangement the preform manufacture and fibre drawing processes may be operated in tandem so that a continuous production of fibre is achieved.

While the processes described herein are primarily directed to the continuous production of clad silica optical fibre, they may also be adapted to the production of fibres of other glass materials.

We claim:

1. A method of manufacturing a continuous preform for an optical fibre of the type produced from glass or silica tubes or rods, the method including arranging the tubes or rods end to end in a rectilinear array, placing glass or silica sleeving tubes abutting one another over the joints between the rods or tubes, and heating the preform so as to fusion seal the joints between the rods or tubes and between the abutting sleeving tubes and to fusion seal the sleeving tubes to the tubes or rods to form a continuous preform.

2. A method as claimed in claim 1 in which the ends of the rods or tubes are prepared by a laser cutting process.

3. A method of manufacturing a continuous preform for an optical fibre of the type produced from a silica tube via a rod preform stage, the method including collapsing inwardly lengths of silica tube each into a rod preform, arranging the preforms end to end in a rectilinear array, placing silica sleeving tubes abutting one another over the rods, and heating the preform so as to fusion seal the assembly into a continuous rod, whereby the joints between the rods or tubes and between the abutting sleeving tubes are sealed and in which the sleeving tubes are so arranged that the joints therebetween are not coincident with the joints between the rods.

4. A method as claimed in claim 1 and in which the silica preform tubes are each provided with one or more internal coatings of doped silica.

5. A method as claimed in claim 1 and in which the sleeving tubes are substantially longer than the rod preforms.

6. A method as claimed in claim 1 and in which the end portions of the rod preforms are removed prior to jointing.

7. A method of manufacturing a continuous preform for an optical fiber of the type produced from glass or silica rods or tubes, the method including grinding down the end portions of the rods or tubes to form a reduced diameter shoulder, arranging the tubes or rods end to end in a rectilinear array in which a glass or silica sleeving tube in the form of a collar is disposed between the shoulders of each abutting pair of rods or tubes, and heating the preform so as to fusion seal the joints between the rods and tubes and between the sleeving tubes and the rods or tubes.

* * * * *